US012352042B2

(12) United States Patent
Vonaesch et al.

(10) Patent No.: US 12,352,042 B2
(45) Date of Patent: Jul. 8, 2025

(54) BUILDING SLIDING DOOR SYSTEM WITH FIRE PROTECTION

(71) Applicant: Inventio AG, Hergiswil (CH)

(72) Inventors: Jonas Vonaesch, Lucerne (CH); Florian Trosch, Erlenbach ZH (CH)

(*) Notice: Subject to any disclaimer, the term of this patent is extended or adjusted under 35 U.S.C. 154(b) by 31 days.

(21) Appl. No.: 18/551,200

(22) PCT Filed: Mar. 4, 2022

(86) PCT No.: PCT/EP2022/055542
§ 371 (c)(1),
(2) Date: Sep. 19, 2023

(87) PCT Pub. No.: WO2022/200015
PCT Pub. Date: Sep. 29, 2022

(65) Prior Publication Data

US 2024/0167268 A1 May 23, 2024

(30) Foreign Application Priority Data

Mar. 26, 2021 (EP) .................................... 21165154

(51) Int. Cl.
*E04B 1/94* (2006.01)
*E05D 15/06* (2006.01)

(52) U.S. Cl.
CPC .......... *E04B 1/941* (2013.01); *E05D 15/0643* (2013.01); *E05Y 2201/406* (2013.01); (Continued)

(58) Field of Classification Search
CPC ............... E04B 1/941; E05Y 2201/406; E05Y 2201/64; E05Y 2201/684; E05Y 2900/14
See application file for complete search history.

(56) References Cited

U.S. PATENT DOCUMENTS 5,305,901 A * 4/1994 Dennig .................. E06B 5/164 220/88.1
12,139,964 B2 * 11/2024 Gayhart ................ E05F 15/652
(Continued)

FOREIGN PATENT DOCUMENTS

EP 2876241 A1 * 5/2015 ........... E06B 3/4645
EP 2876241 B1 * 4/2019 ........... E06B 3/4645
WO WO-2020182512 A1 * 9/2020 ............ E05F 15/632

OTHER PUBLICATIONS

English translation of EP document (Year: 2019).*
English translation of WO document (Year: 2020).*

*Primary Examiner* — Gregory J Strimbu
(74) *Attorney, Agent, or Firm* — Schlee IP International, PC; Alexander R. Schlee; Pascal A. Schlee

(57) ABSTRACT

A building sliding door system separates a first building region from a second building region and has a frame structure that has a passage region and a wall shell region. A sliding door is displaced in the frame structure between a closed position and an open position, wherein the wall shell region at least partially receives the sliding door in the open position. An electromechanical drive unit and a control device control the displacement of the sliding door. A fire protection unit has a bracket and, movably mounted on the bracket, a fire protection device made of a material having a defined fire resistance. The fire protection device is horizontally displaceable within the wall shell region with respect to the bracket between a retracted position in which the sliding door is in the open position, and an extended position in which the sliding door is in the closed position.

14 Claims, 3 Drawing Sheets

(52) U.S. Cl.
CPC ..... *E05Y 2201/64* (2013.01); *E05Y 2201/684* (2013.01); *E05Y 2900/14* (2013.01)

(56) References Cited

U.S. PATENT DOCUMENTS

| | | | | |
|---|---|---|---|---|
| 2011/0016796 | A1 * | 1/2011 | Foster | E06B 7/231 49/477.1 |
| 2020/0229912 | A1 * | 7/2020 | DeZort | A61G 10/02 |
| 2023/0272658 | A1 * | 8/2023 | Schwitalla | E05F 15/60 52/173.1 |

* cited by examiner

Fig. 3A
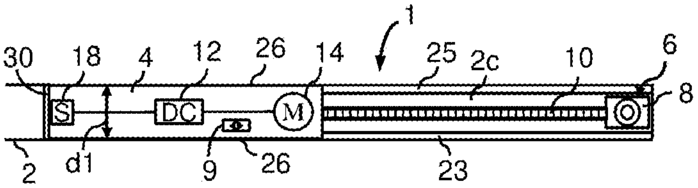
Fig. 3B
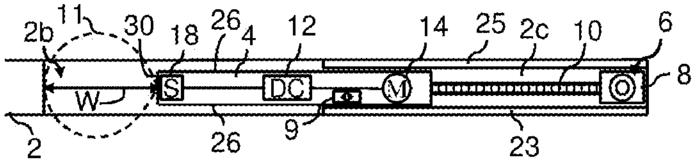
Fig. 3C
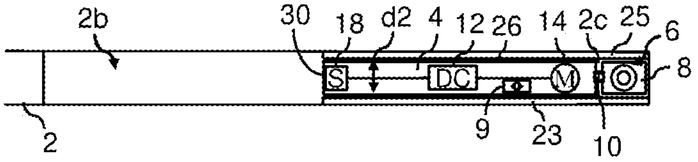
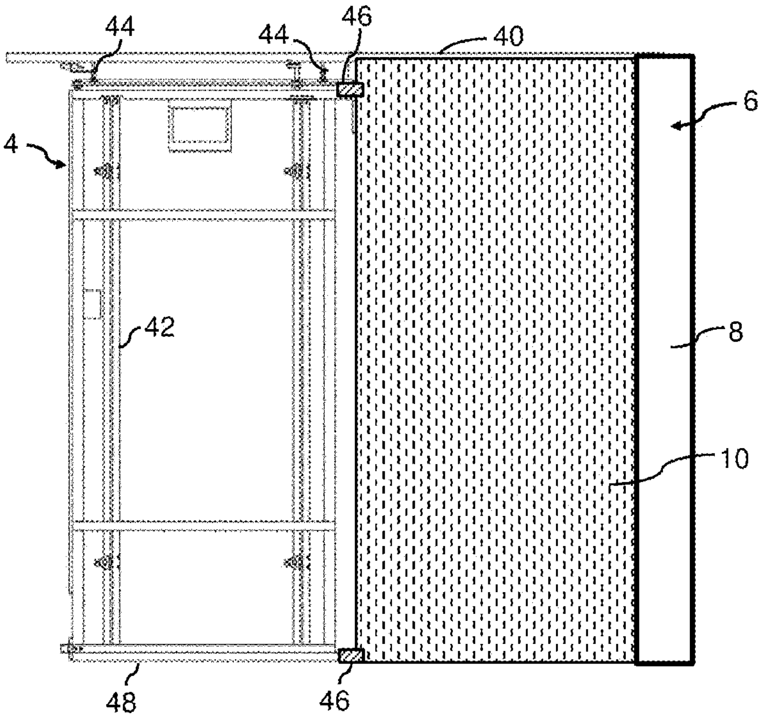
Fig. 4

BUILDING SLIDING DOOR SYSTEM WITH FIRE PROTECTION

FIELD

The technology described herein relates in general to the technical equipment of a building. Exemplary embodiments of the technology relate in particular to the building technical equipment for separating access to the building or to a building interior, and a method for operating the building technical equipment.

BACKGROUND

Buildings can be equipped in a very wide variety of ways to separate access to the building or, within the building, access to an interior space within the building. In a building, the separation is often accomplished by doors. It is known, for example, to install a door frame (door jamb) at an intended location, and to insert a door therein, when constructing a building wall that is made from masonry, concreted, and/or produced in drywall installation (e.g., a wood and/or metal construction in conjunction with gypsum boards). The door can be designed as a single-action door with a movable door leaf which is pivotably fastened to the door frame (jamb, door frame lining) by two or more hinges (door hinges) or as a folding door in which one or more door leaves are divided by hinge bands or flexible strips into several parts which fold out of the closing plane during opening. Sliding doors are also known which are fastened to the frame with runner rails in which the door leaf is hung or inserted and can be displaced laterally.

EP 2 876 241 B1 describes, for example, a sliding door which is displaceable within a frame structure between a closed position and an open position. In the closed position, the sliding door is flush with the wall surrounding it, and in the open position, a recess in the wall receives the sliding door at least partially. One or more seals on the sliding door seal the sliding door against noise, smoke and fire. Despite such a seal, it may not be sufficient in a building which has stricter requirements regarding protection against noise, smoke and fire. There is therefore a need for a technology that makes it possible to meet one or more of these requirements.

SUMMARY

One aspect of such a technology relates to a building sliding door system that separates a first building region from a second building region. The building sliding door system comprises a frame structure which has a passage region and a wall shell region, and a sliding door which is displaceable within the frame structure between a closed position and an open position, wherein the wall shell region at least partially receives the sliding door in the open position. The building sliding door system also has an electromechanical drive unit and a control device, wherein the electromechanical drive unit and the control device are configured to control the displacement of the sliding door. In addition, the building sliding door system has a fire protection unit which has a bracket and a fire protection device, made of a material having a defined fire resistance, which is movably mounted on the bracket. In relation to the bracket within the wall shell region, the fire protection device is displaceable horizontally between a retracted position in which the sliding door is in the open position, and an extended position in which the sliding door is in the closed position.

The technology described herein creates a building sliding door system in which an additional fire protection measure is provided. This fire protection measure is provided in the wall shell region and is used in particular when the sliding door is in the fully closed position. This also provides sufficient fire protection in the cavity of the wall shell region even though the cavity provided for receiving the sliding door cannot be filled with sound-insulating or fire-retardant material.

The fire protection device is configured to form a fire-protection surface which is at least equal to a vertical area which is provided in the wall shell region for receiving the sliding door. The fire protection device can be dimensioned such that it is equal to or greater than the area which the sliding door occupies in an open position.

The fire protection unit can be designed in various ways. The fire protection unit can be designed as a passive fire protection unit, wherein the fire protection device can be moved horizontally together with the sliding door. In an exemplary embodiment, the sliding door can be coupled to the fire protection device, whereby the sliding door carries along the fire protection device during closing and moves it into the extended position. In an exemplary embodiment, the sliding door can also carry along the fire protection device while opening the sliding door and can move it into the retracted position. In these exemplary embodiments, it may be sufficient to control the sliding door which then acts on the fire protection device.

According to an exemplary embodiment, the fire protection unit can be designed as an active fire protection unit. In this case, the fire protection device can be extended horizontally independently of the sliding door when the sliding door is in the closed position. In an exemplary embodiment, the fire protection unit has an electromechanical drive unit which is connected to the control device and/or to an interface device. As an active fire protection unit, it can, for example, be selectively activated and extended or retracted, for example at fixed times and in the event of a fire alarm in the building.

In an exemplary embodiment, the bracket is arranged on the frame structure. In another exemplary embodiment, it is designed for fastening to a building wall. A person skilled in the art will recognize that it can also be fastened to the frame structure and to the building wall. The arrangement of the bracket can therefore be selected depending on the building and the design of the fire protection unit.

A choice is also possible with regard to the manner in which the sliding door and the fire protection device are displaceable. In an exemplary embodiment, an upper guide rail is arranged on the frame structure, and the sliding door has a roller mechanism by means of which the sliding door can be displaced in the upper guide rail. If a roller mechanism is used on the sliding door, the fire protection device can be coupled to the roller mechanism of the sliding door and be displaceable by it in the upper guide rail. In another exemplary embodiment, instead of a roller mechanism, a slider mechanism can be provided; here too, the mentioned coupling can be provided in order to arrange the fire protection device displaceably in the upper guide rail.

In an exemplary embodiment, the fire protection device is guided vertically through a bottom-side passage of the upper guide rail and is displaceable along the passage. In another exemplary embodiment, the fire protection device is displaceable along an outer longitudinal side of the upper guide rail. These arrangement options allow the fire protection device to be displaced in a guided manner (controlled) on or very close to the guide rail. In addition, this creates a possibility of guiding the fire protection device upwardly as far as possible on the frame structure so that the fire protection device covers at least the vertical area of the wall shell region and, depending on the dimensioning, projects beyond it in order to achieve the best possible sealing against fire and smoke.

The sliding door arranged in the building sliding door system can be designed in various ways. In an exemplary embodiment, the sliding door has an inner door leaf, an outer door leaf and an actuator which is designed to move the two door leaves towards one another during an opening movement of the sliding door, wherein a thickness of the sliding door is reduced in order to enable accommodation by the respective wall shell region, and to move the two door leaves away from one another during a closing movement, thereby increasing the thickness of the sliding door. The technology described here can be used in conjunction with such a sliding door, but the technology can also be used in conjunction with a sliding door in which the thickness of the sliding door is not changed.

In an exemplary embodiment, the fire protection measure provided in the building sliding door system is supplemented by a fire protection material and/or soundproofing material being arranged between the door leaves, the fire protection material and/or soundproofing material being selected according to the building-specific specifications.

DESCRIPTION OF THE DRAWINGS

Various aspects of the improved technology are described in greater detail below in conjunction with the drawings with reference to exemplary embodiments. In the figures, identical elements have identical reference signs. In the drawings:

FIG. 3A shows a schematic horizontal cross-section of an exemplary embodiment of the building sliding door system, wherein the sliding door is closed and the fire protection device is extended;

FIG. 3B shows a schematic representation of the sliding door and of the fire protection device of FIG. 3A in an intermediate position;

FIG. 3C shows a schematic representation of the sliding door and of the fire protection device from FIG. 3A, wherein the sliding door is open and the fire protection device is retracted;

FIG. 4 shows a schematic representation of the building sliding door system in a side view, wherein the sliding door is coupled to the fire protection device and to the fire protection surface thereof;

DETAILED DESCRIPTION

Figure 1:
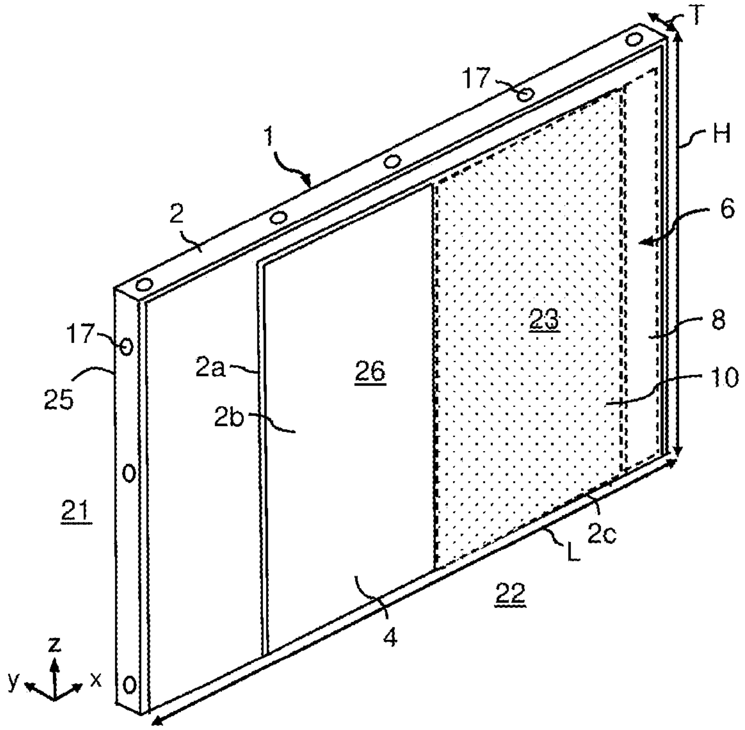
FIG. 1 shows a schematic perspective representation of an exemplary embodiment of a building sliding door system with a closed sliding door and an extended fire protection device.

FIG. 1 is a schematic perspective representation of an exemplary embodiment of a building sliding door system 1 for separating a first building zone 21 from a second building zone 22. In an exemplary embodiment, the building sliding door system 1 can be a part of a building inner wall, for example in an apartment building, it can separate the private interior region of an apartment (for example, the first zone 21) from a (non-private) exterior region (for example, a hallway or stairwell) (for example, the second zone 22). Similarly, the building sliding door system 1 can be used, for example, in a building interior wall in an office building, hotel, or the like; in a hotel, the building sliding door system 1 can separate two adjacent rooms, for example. In another exemplary embodiment, the building sliding door system 1 can be a part of a building exterior wall, for example it can separate the interior region (for example, the first zone 21) of a non-public building (for example, an apartment building, hotel, business building, or the like) from the public exterior region (for example, a street or a public space) (for example, the second zone 22). In the following, the first zone 21 is referred to as the interior zone 21, and the second zone 22 is referred to as the exterior zone 22.

In the shown exemplary embodiment, the building sliding door system 1 has a frame structure 2 in which different regions can be established. For illustration and differentiability, these regions are referred to below as the door frame region 2*a*, the passage region 2*b* and the wall shell region 2*c*. In FIG. 1, the door frame region 2*a* is located on the left of the passage region 2*b*, it also being possible for it to extend over the passage region 2*b*, and the wall shell region 2*c* is located on the right of the passage region 2*b*, it also being possible for it to extend over the passage region 2*b*. The passage region 2*b* is thus surrounded by the door frame region 2*a*, the wall shell region 2*c* and a building floor 3 FIG. 2), or a threshold 3*a* (FIG. 2), or guide rails 40, 48 (FIG. 4) arranged there.

A wall panel 25 (hereafter referred to as wall inner panel 25) facing the interior zone 21, a wall panel 23 (hereafter referred to as wall outer panel 23) facing the exterior zone 22, and lateral fastening devices 17 are arranged on the frame structure 2. The wall inner panel 25 is arranged substantially parallel to the wall outer panel 23, wherein the wall panels 23, 25 in particular cover (clad) the door frame region 2*a* and the wall shell region 2*c* and their look is harmonized with the surrounding wall. The lateral fastening devices 17 are provided for connecting the building sliding door system 1 to the building. In relation to the x-y-z coordinate system shown in FIG. 1, the building sliding door system 1 has a length L in the x direction, a depth T in the y direction, and a height H in the z direction; the building sliding door system 1 extends in a plane which is spanned by the x and z axes.

The building sliding door system 1 also includes a sliding door 4 which is displaceable in the frame structure 2 between a closed position and an open position. In the closed position, the sliding door 4 closes the passage region 2*b*, and in the open position, the sliding door 4 opens the passage region 2*b* completely or partially so that, for example, a person, a pet or a robot can pass from one of the zones 21, 22 into the other zone. The wall shell region 2*c* has a cavity between the wall panels 23, 25, which cavity is dimensioned such that it at least partially receives the sliding door 4 in the open position.

Figure 2:
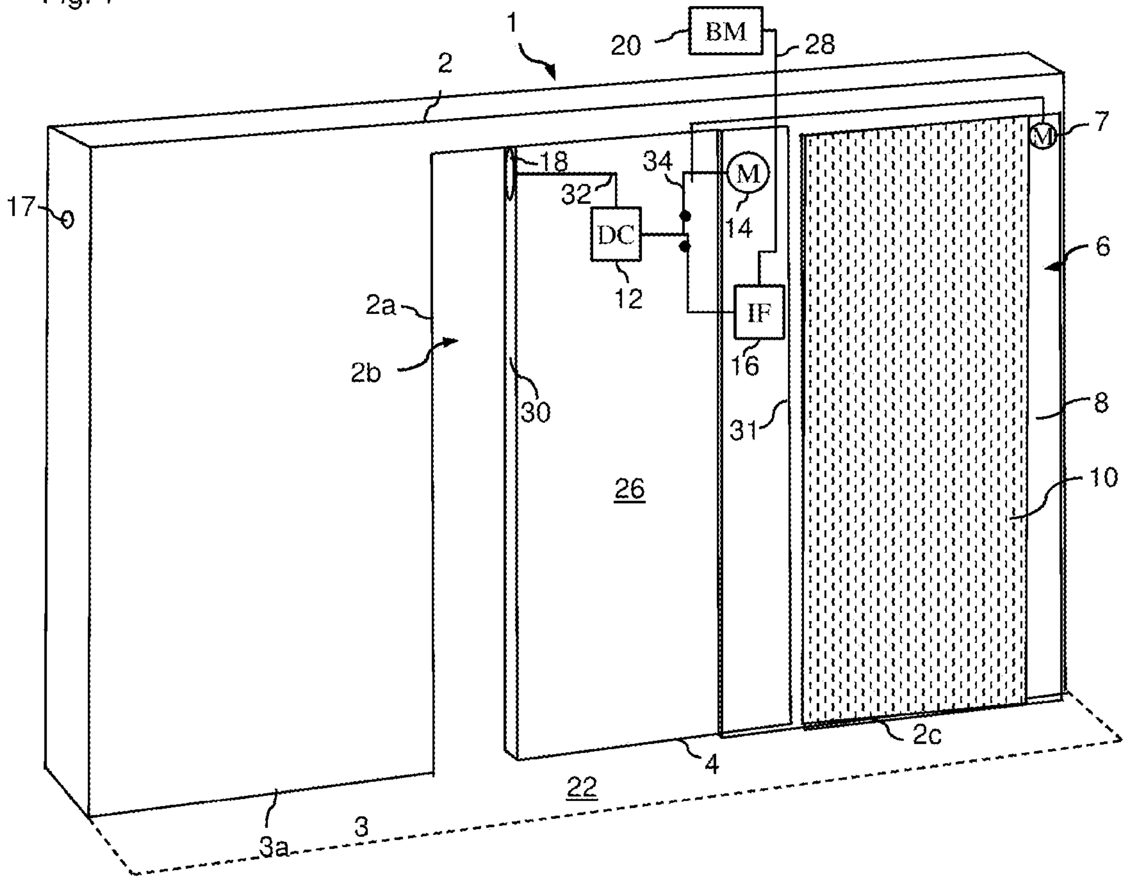
FIG. 2 shows a schematic representation of the building sliding door system, wherein the sliding door is partially opened, the fire protection device is partially extended, and exemplary system components are arranged.

FIG. 2 is likewise a schematic perspective representation of an exemplary embodiment of the building sliding door system 1, wherein the sliding door 4 is shown by way of example in an intermediate position in which the sliding door 4 is partially open and partially opens the passage region 2*b*. In FIG. 2, it is indicated that the building sliding door system 1 has electronic and electromechanical components and is connected to a building control system 20 (BM). The building control system 20 can be connected to a fire alarm system. In addition, in FIG. 2, a wall panel 23 has been removed to show a fire protection unit 6 arranged in the building sliding door system 1. In FIG. 1, the fire protection unit 6 is drawn with dashed lines because in the shown exemplary embodiment, it is behind the wall panel 23 and not visible from the outside.

The fire protection unit 6 has a bracket 8 and a fire protection device 10, which is designed to form a barrier for fire and smoke in the wall shell region 2*c* of the building sliding door system 1. The aforementioned barrier exists in particular when the sliding door 4 is in the closed position and the fire protection device 10 forms a fire-protection surface. In an exemplary embodiment, the flame protection area extends parallel to the x-z plane, wherein the size of the area corresponds to at least the vertical area of the wall shell region 2*c*; this situation is shown in FIG. 1. In FIG. 2, the sliding door 4 is somewhat open, the fire-protection surface which forms the fire protection device 10 is correspondingly smaller. In this situation, the fire protection is from the fire protection device 10 and the part of the sliding door 4 which is located in the wall shell region 2*c*. In an exemplary embodiment, the size of the fire-protection surface of the fire protection device 10 is selected such that it projects beyond the vertical surface of the wall shell region 2*c* in order to thereby achieve the best possible sealing against fire and smoke. Examples of embodiments of the fire protection device 10 are given elsewhere in this description.

In the situation shown in FIG. 1 and FIG. 2, the technology described herein can be used in an advantageous manner. Summarized briefly and by way of example, the technology described here makes it possible to provide a fire protection measure in the cavity of the wall shell region 2*c*, in particular when the sliding door 4 is in the fully closed position. Since the cavity is provided for receiving the sliding door 4 when it is opened, the cavity cannot be filled with sound or fire-absorbing material, which may be desired depending on the building and/or the use of the building sliding door system 1. According to the technology described here, the fire protection measure consists in providing the fire protection unit 6 in the wall shell region 2*c*, the fire protection device 10 of which can be extended and retracted in relation to the stationary bracket 8 in the horizontal direction in order to fill up at least one vertical surface of the wall shell region 2*c*, which does not cover the sliding door 4 in a momentary position, with the formed fire protection surface. The fire protection unit 6 (or its fire protection device 10) can be designed, for example, similarly to a roller blind or a (perpendicular) awning, or in the form of a folding mechanism, wherein a vertical (proximal) side, which is at or close to the bracket 8, is in each case substantially stationary (it can be fastened, for example, to the bracket 8), and wherein a vertical (distal) side 31 opposite the bracket 8 is designed to move along with the sliding door 4 and thus move out and retract the fire protection device 10 in the horizontal direction.

The fire protection device 10 consists entirely or partially of a material which has a defined fire resistance. In the field of fire protection, the fire resistance of a material indicates the duration during which the material maintains its function during a normal fire. The material can be, for example, a textile fabric, for example of a flame-retardant synthetic fiber, glass fiber or a combination of synthetic fiber and glass fiber. The material can also be a construction of metal and/or plastic elements that are flexibly interconnected or a combination of such elements and a textile fabric. A person skilled in the art is aware of materials suitable for fire protection in the form of a firewall or a fire protection curtain, for example fire protection drapes from SIMON PROtec Systems AG, Switzerland. Further details in the regard therefore do not appear to be necessary at this point.

The fire protection device 10 can be configured in different ways. The type of the material selected for the fire protection device 10 can be, for example, a factor in the design of the fire protection unit 6. For example, a construction of metal elements that are flexibly interconnected can have a certain inherent stiffness or stability and can be rolled up or folded. A textile fabric, for example a glass fabric, on the other hand has a lower inherent stiffness and can be rolled up, for example. A textile fabric can also be brought into a foldable shape in conjunction with a supporting or supporting structure (e.g. made of metal).

The bracket 8 of the fire protection unit 6 can be arranged on the frame structure 2 or a building wall on which the frame structure 2 is fastened. In an exemplary embodiment, the bracket 8 has a reel which has a roller, coil or cross-shaped structure which is mounted rotatably about a central axis. The central axis extends substantially in the vertical direction (z-axis in FIG. 1). For this exemplary embodiment, the fire protection device 10 can consist essentially of a flexible textile fabric in order to be rolled up onto the reel and unrolled therefrom. In an unrolled state, the fire protection device 10 extends within the wall shell region 2*c* parallel to the x-z plane, as shown in FIG. 1 and FIG. 2.

Before further statements are made regarding the fire protection unit 6 and its mode of operation, details of the sliding door 4 will be given below. The sliding door 4 has two substantially parallel door leaves 26 (on an inner side and an outer side of the sliding door 4, respectively). The door leaves 26 are spaced apart from one another (in the y-direction) such that there is an inner space, between the door leaves 26, in which system components and insulating material, e.g., for soundproofing and fire protection, can be arranged. The door leaves 26 can be connected to one another in the region of an end face 30, which points in the direction of the passage region 2*b*. Each of the door leaves 26 extends in parallel with the x-z plane.

In FIG. 2, exemplary system components of the building sliding door system 1 are shown: an electrical interface device 16, a control device 12 (DC) and a drive unit 14 (M). In an exemplary embodiment, the sliding door system 1 is connected to the building control system 20 (BM); in the exemplary embodiment shown in FIG. 2, this connection is made by means of an electrical connection 28. The building sliding door system 1 is supplied with electrical energy, for example, via this connection 28. In an exemplary embodiment, operation of the building sliding door system 1 can be ensured by the supplied energy without external control signals or control commands being supplied thereto. In this exemplary embodiment, system components which check for example a key, an access code, or another type of access authorization are integrated (locally) in the building sliding door system 1 such that it can be operated autonomously—apart from the electrical energy.

In another exemplary embodiment, external control signals or control commands can be supplied to the building sliding door system 1—for example, in connection with checking an access authorization. In this exemplary embodiment, the electrical interface device 16 is in addition provided for communication between the building control system 20 and the building sliding door system 1. For this purpose, the electrical connection 28 has a communication network to which the building control system 20 and the interface device 16 are coupled. The building control system 20 may have a computer-assisted building management system in which data of access-authorized users and objects are stored.

A person skilled in the art will recognize that the building control system 20 can be arranged in the building, wherein the building control system 20 is designed as a local unit, which is independent of an external system, for operating the building sliding door system 1 (or also several such systems). In an exemplary embodiment, functions of the building control system 20 can be distributed in subsystems or components arranged locally in and remote from the building. For this purpose, the subsystem arranged in the building can be coupled to an IT infrastructure for so-called cloud computing (colloquially also referred to as the "cloud"). This includes, for example, storing data in a remote data center but also executing programs that are installed remotely rather than locally. Depending upon the design, a certain functionality can be made available, for example, in the control device 12 or via the "cloud." For this purpose, a software application or program parts thereof can be executed in the "cloud," for example. The control device 12 then accesses this infrastructure via the interface device 16, as required, in order to execute the software application.

In a system embodiment, the electrical connection 28 can have an electrical bus system. In an exemplary embodiment, the electrical connection of the sliding door system 1, including its supply with electrical energy, is made via the interface device 16. A person skilled in the art will recognize that several sliding door systems 1 can be provided in the building, and that each of these building sliding door systems 1 can be coupled to the electrical connection 28, in order to communicate with the building control system 20, for example, in connection with determining and checking access authorizations if this is done centrally by the building control system 20.

In the shown exemplary embodiment, the sliding door 4 has a sensor unit 18 which is connected to the control device 12 by an electrical connection 32. The sensor unit 18 is arranged on the end face 30 of the sliding door 4, wherein the arrangement thereof is selected such that electromagnetic radiation (light or radio waves), for example emitted by the sensor unit 18, can propagate unhindered in the direction of the passage region 2*b* during operation. The sensor unit 18 can, for example, be inserted into a recess in the end face 30 and protected from damage and dirt by a radiation-permeable cover. The control device 12 is also connected to the drive device 14 and the interface device 16 by means of an electrical connection 34. The electrical connection 32 between the sensor unit 18 and the control device 12 and the electrical connection 34 run inside the sliding door 4—for example, between the door leaves 26. The electrical connections 32, 34 are designed for signal and/or energy transmission; for this purpose, they can each have individual electrical lines or an electrical bus system.

In the following, the functionality of the building sliding door system 1 is described with reference to FIGS. 3A-3C. FIGS. 3A-3C each show a schematic representation of a horizontal cross-section of an exemplary embodiment of the building sliding door system 1 with the sliding door 4 and the fire protection unit 6. Each of these views shows the components which the sliding door 4 has (sensor unit 18 (S), control device 12 (DC) and drive unit 14 (M)); for the purpose of illustration, the interface device 16 and the connection thereof to the building control system 20 are not shown. The drive unit 14 and the control device 12 are arranged inside the sliding door 4, and in particular between the door leaves 26. The fire protection unit 6 with the bracket 8 and the fire protection device 10 in the wall shell region 2*c* are also shown in FIGS. 3A-3C.

The shown exemplary embodiment of the sliding door 1 is based upon a principle that is similar to a principle known from EP 2 876 241 A1. A sliding door system is described therein in which two opposite door surfaces are coupled to an actuator which moves the door surfaces towards or away from one another. In relation to the sliding door system 1 according to the technology described here, this means that the two door leaves 26 have a leaf spacing d1 (FIG. 3A) when the sliding door 4 is in the closed position. During the opening of the sliding door 4, the two door leaves 26 are moved towards one another by means of an actuator 9 (FIGS. 3A-3C) until they have a leaf spacing d2 (FIG. 3C) which is dimensioned such that the sliding door 4, when in its fully or partially open position (FIG. 3B and FIG. 3C), has such a small thickness that it fits into the accommodating structure in the wall shell region 2*c*. The leaf spacing d1 is greater than the leaf spacing d2. When the sliding door 4 is pushed out of the wall shell region 2*c*, the two door leaves 26 are moved away from one another (spread apart) such that the sliding door 4 when closed (FIG. 3A) assumes a defined thickness. The thickness is set so that the outer sides of the two door leaves 26, in the closed position, are essentially flush with the outer sides of the wall shell region 2*c* or the cladding thereof (wall panels 23, 25). As a result, a substantially smooth finish is achieved on both wall sides in the door region.

In an exemplary embodiment, the building sliding door system 1 has, on a door transom, a guide device which bears the sliding door 4 and guides it on its path between the closed position and the open position. The sliding door 4 has a complementary device on its upper edge. The guide device and the complementary device interact when the drive unit 14 causes the sliding door 4 to move and, for example, acts on the complementary device. The guide device and the complementary device form, for example, a roller mechanism (for example a roller-mounted carriage system (roller carriage). The drive unit 14 can have, for example, a motorized or pneumatic sliding drive which acts, for example, on the sliding door 4. A person skilled in the art will recognize that the embodiment is not limited to a roller mechanism, and that the guide device and the complementary device can be designed in a different manner, for example as a telescopic extension.

In an exemplary embodiment, the two door leaves 26 are moved towards or away from one another, see the direction arrow W in the area 11 of FIG. 3B, by the actuator 9. The actuator 9 can have a spreading device which is activated mechanically, electrically, or electro-mechanically. The spreading device is designed to move the door leaves 26 towards one another when the sliding door 4 is to be opened, and to move them away from one another when the sliding door 4 is to be closed. A person skilled in the art would recognize that other spreading devices can also be provided instead—for example, cylinders actuated by a pressure medium.

As mentioned elsewhere in this description, the fire protection device 10 is, with respect to the bracket 8, displaceable horizontally within the wall shell region 2*c* (FIG. 3C) between the retracted position in which the sliding door 4 is in the open position and the extended position (FIG. 3A) in which the sliding door 4 is in the closed position. An exemplary position in which the fire protection device 10 is partially extended or retracted is shown in FIG. 3B. It can also be seen in these figures that the fire-protection surface formed by the fire protection device 10 depends on how far the fire protection device 10 is extended or retracted. A person skilled in the art will recognize that the distances between the fire protection device 10 and the wall panels 23, 25 seen in particular in FIG. 3A and FIG. 3B are not true to scale.

According to an exemplary embodiment, the fire protection unit 6 is designed as a passive fire protection unit 6. In an exemplary embodiment, the fire protection device 10 is coupled to the sliding door 4, wherein the fire protection unit 6 is designed such that the sliding door 4 moves the fire protection device 10 horizontally starting from the fully or partially retracted position into a fully or partially extended position. The sliding door 4 can be coupled to the distal end of the fire protection device 10 and pull on it in order to extend the fire protection device 10. In an exemplary embodiment, the fire protection unit 6 can be designed such that the sliding door 4 moves the fire protection device 10 horizontally starting from the fully or partially extended position into a fully or partially retracted position. In one exemplary embodiment, the fire protection device 10 can therefore be extended and retracted by the sliding door 4. In this exemplary embodiment, this also means that the fire protection device 10 and the sliding door 4 are moved together.

In an exemplary embodiment, the fire protection unit 6 can be designed such that the fire protection device 10 is extended against a restoring force. The restoring force supports, for example, the retraction of the fire protection device 10 by the sliding door 4. In another exemplary embodiment, the fire protection device 10 can be moved automatically by the sliding door by the restoring force and without pushing. In these exemplary embodiments too, the fire protection device 10 and the sliding door 4 can move together.

In order to exert the restoring force, one or more springs can be present in the fire protection unit 6, which springs are tensioned when the fire protection device 10 is extended. For example, the bracket 8 can have a coil-spring mechanism (roll spring mechanism) in which a coil spring is moved back and forth between two housings (for example, the reel as output drums and a supply drum). When the fire protection device 10 is extended (i.e. when the coil spring mechanism is wound up), the spring is wound up in the output drum. During the procedure, the spring retracts into the supply drum in order to assume its original shape, while driving the reel.

According to another exemplary embodiment, the fire protection unit 6 can be designed as an active fire protection unit 6. For this purpose, the fire protection unit 6 can be an electromechanical drive unit 7 (electric motor) (FIG. 2) which is connected to the control device 12 and/or to the interface device 16. The control of the drive unit 7 can be designed such that the drive unit 7 moves the fire protection device 10 in and out. In this case, it is not necessary for the sliding door 4 to pull the fire protection device 10 along with it for extension or push it for retraction. In another exemplary embodiment, the control of the drive unit can be configured such that it only extends the fire protection device 10 in the event of a fire alarm.

According to a further exemplary embodiment, a holding device, which triggers only in the case of a fire alarm, can be provided in conjunction with the passive embodiment of the fire protection unit 6. For this purpose, the building sliding door system 1 can be designed such that the fire protection device 10 remains in the retracted position, and the sliding door 4 is moved independently thereof. If a fire alarm is triggered in the building, the fire protection device 10 will be extended. This can take place by the sliding door 4 being moved in a controlled manner from the closed position into the open position in order to couple it to the fire protection device 10 and to pull it shut when the sliding door 4 is then moved back into the closed position. An advantage of this is that only one drive is to be provided, and whether the fire protection device 10 is extended can nevertheless be controlled. The fire protection unit 6 and in particular the fire protection device 10 are therefore subject to less wear. In this embodiment, it is also possible for the fire protection device 10 to be extended, for example, only at night or in the event of an empty building; in other situations, for example, during business and office hours or during frequent use, the fire protection device can remain in the “rest position”.

FIG. 4 shows a schematic representation of the building sliding door system 1 in a side view. The sliding door 4 can move along an upper guide rail 40 and a lower guide rail 48. In an exemplary embodiment, the sliding door 4 has a roller mechanism 44, by means of which the sliding door 4 is hung on the upper guide rail 40; the roller mechanism 44 being supported on vertical posts 42 extending upwardly from the lower guide rail 48. The lower guide rail 48 supports the guidance of the sliding door 4 in the direction of the x axis and prevents (or reduces) a possible swinging in the direction of the y axis. In an exemplary embodiment, the fire protection device 10 can also move along these guide rails 40, 48; for example, it can also be hung in the upper guide rail 40.

The sliding door 4 is coupled to the fire protection device 10 by means of exemplary connecting elements 46. In FIG. 4, two connecting elements 46 are shown, which are arranged on the rear side of the sliding door 4 and on the distal side of the fire protection device 10, in each case on or in the region of the upper and lower horizontal sides thereof. A person skilled in the art will recognize that, as an alternative to this, the coupling can be made by one or more than two connecting elements 46, which can also be arranged at other points; for example a single connecting element 46 can be arranged at approximately half the height of the fire protection device 10. In one embodiment, the coupling elements 46 are configured to establish and disconnect the coupling. Establishing and disconnecting can be repeated, for example if, in the above-mentioned exemplary embodiment, the fire protection device 10 is to be coupled to the sliding door 4 only in the event of a fire.

FIG. 4 shows the fire-protection surface of the fire protection device 10 for the purpose of illustration. The fire-protection surface extends from the upper guide rail 40 as far as the lower guide rail 48. The fire protection device 10 thus covers an area which is larger than the area covered by the sliding door 4. This achieves the best possible sealing against fire and smoke.

Figure 5:
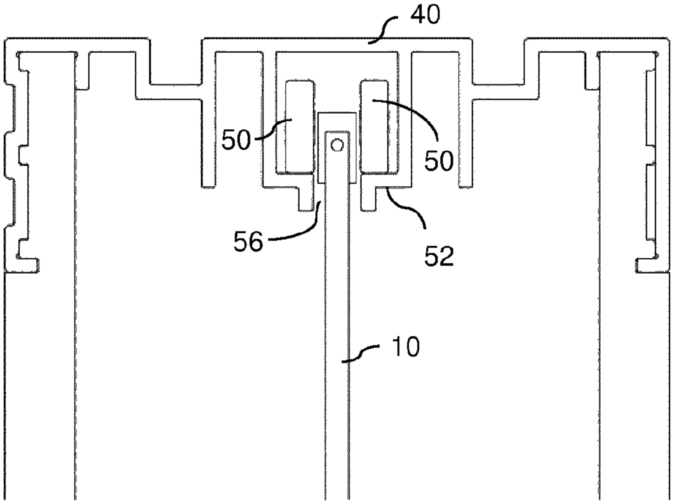
FIG. 5 shows a schematic representation of a first exemplary embodiment of a guide device for the fire protection device.

FIG. 5 shows a schematic front view of an exemplary embodiment of an upper guide device for the fire protection device 10. In this exemplary embodiment, the upper guide rail 40 is designed as a cuboid-shaped hollow profile which extends in the direction of the x axis, wherein FIG. 5 shows a cross-section through an upper part of the building sliding door system 1 perpendicular to the x axis. The guide rail 40 has, on an underside, a rolling surface 52 and a passage 56 which extends along the x-axis. A roller mechanism 50, by means of which the fire protection device 10 is hung on the guide rail 40 and which can move along the rolling surface 52, is present in the interior of the guide rail 40. The fire protection device 10 is guided through the passage 56.

The roller mechanism 50 is shown by way of example as a pair of rollers, wherein the rollers of the roller pair are arranged on opposite sides of the fire protection device 10. Along the x axis, the roller mechanism 50 can have more than one pair of rollers. A person skilled in the art will recognize that the shown guide device with the roller mechanism 50 is an example, and that the guide device can also be designed in another way, for example the rollers can be arranged only on one side of the fire protection device 10, or a sliding mechanism can be used instead of the roller mechanism 50.

Figure 6:
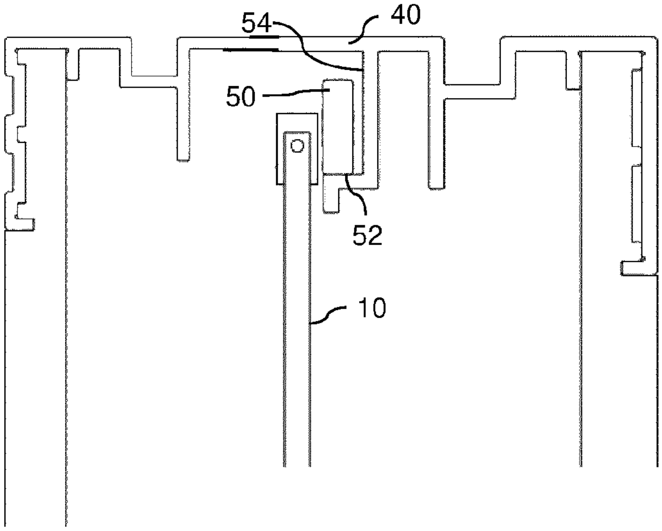
FIG. 6 shows a schematic representation of a second exemplary embodiment of a guide device for the fire protection device.

In another exemplary embodiment, the fire protection device 10 can be fastened to the sliding door 4 and/or to the guide rail or guide carriage thereof. In this case, no separate guide rail (or guide carriage) needs to be provided for the fire protection device 10. A reinforcement at the upper end of the fire protection device 10 can tighten the fire protection device 10. A person skilled in the art will also recognize that the fire protection device 10 can alternatively be arranged laterally on the guide rail 40 for introduction through the passage 56, as shown in FIG. 6, wherein the fire protection device 10 is displaceable along an outer longitudinal side 54 of the guide rail 40. If a single fire protection device 10 is not sufficient to meet set fire protection requirements, two fire protection devices 10 can be provided, each being displaceable by means of such a lateral arrangement.

In an exemplary embodiment, the lower guide rail 48 (FIG. 4) can be used to support the guidance of the fire protection device 10 at the lower side in the direction of the x axis. In another exemplary embodiment, a separate guide rail can be provided for the fire protection device 10, or guidance of a lower part of the fire protection device 10 can be dispensed with.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A building sliding door system for separating a first building region from a second building region, the building sliding door system comprising:

a frame structure having a passage region and a wall shell region;

a sliding door displaceable in the frame structure between a closed position and an open position, wherein the wall shell region at least partially accommodates the sliding door when in the open position;

a drive unit and a control device connected to control the displacement of the sliding door between the closed position and the open position; and a fire protection unit having a bracket mounted to the frame structure and a fire protection device movably mounted on the bracket, the fire protection device being formed of a material with a predetermined fire resistance, wherein the fire protection device is displaceable horizontally within the wall shell region between a retracted position when the sliding door is in the open position, and an extended position when the sliding door is in the closed position, wherein the fire protection device forms a fire-protection surface at least equal to a vertical area in the wall shell region for receiving the sliding door.

2. The building sliding door system according to claim 1 wherein the fire protection unit is a passive fire protection unit with the fire protection device moved horizontally together with the displacement of the sliding door.

3. The building sliding door system according to claim 2 wherein the sliding door is coupled to the fire protection device and the sliding door carries along the fire protection device when the sliding door is being closed thereby moving the fire protection device into the extended position.

4. The building sliding door system according to claim 3 wherein the sliding door carries along the fire protection device when the sliding door is being opened thereby moving the fire protection device into the retracted position.

5. The building sliding door system according to claim 1 wherein the fire protection unit is an active fire protection unit with the fire protection device adapted to extend horizontally independently of the sliding door when the sliding door is in the closed position.

6. The building sliding door system according to claim 5 wherein the active fire protection unit includes another drive unit connected to the control device and/or an interface device to move the fire protection device between the retracted position and the extended position.

7. The building sliding door system according to claim 1 wherein the bracket is adapted to fasten to a building wall.

8. The building sliding door system according to claim 1 including an upper guide rail arranged on the frame structure and wherein the sliding door has a roller mechanism by which the sliding door is displaceable on the upper guide rail.

9. The building sliding door system according to claim 8 wherein the fire protection device is coupled to the roller mechanism of the sliding door and is displaceable thereby on the upper guide rail.

10. The building sliding door system according to claim 8 wherein the fire protection device has a roller mechanism by which the fire protection device is displaceable on the upper guide rail.

11. The building sliding door system according to claim 8 wherein the fire protection device extends vertically through a passage in the upper guide rail and is displaceable horizontally along the passage.

12. The building sliding door system according to claim 8 wherein the fire protection device is displaceable horizontally along an outer longitudinal side of the upper guide rail.

13. The building sliding door system according to claim 1 wherein the sliding door has an inner door leaf, an outer door leaf, and an actuator adapted to move the inner and outer door leaves towards one another during an opening movement of the sliding door, thereby reducing a thickness of the sliding door to accommodate the sliding door in the wall shell region, and adapted to move the inner and outer door leaves away from one another during a closing movement of the sliding door, thereby increasing the thickness of the sliding door.

14. The building sliding door system according to claim 13 including a door area arranged between the inner door leaf facing the first building region and the outer door leaf facing the second building region, wherein the door area is adapted to receive fire protection and/or soundproofing material.

* * * * *